March 7, 1967
K. RUPP
3,308,246
TRANSISTORIZED AMPLIFYING DEVICE FED ON ALTERNATING CURRENT
Filed Dec. 18, 1961
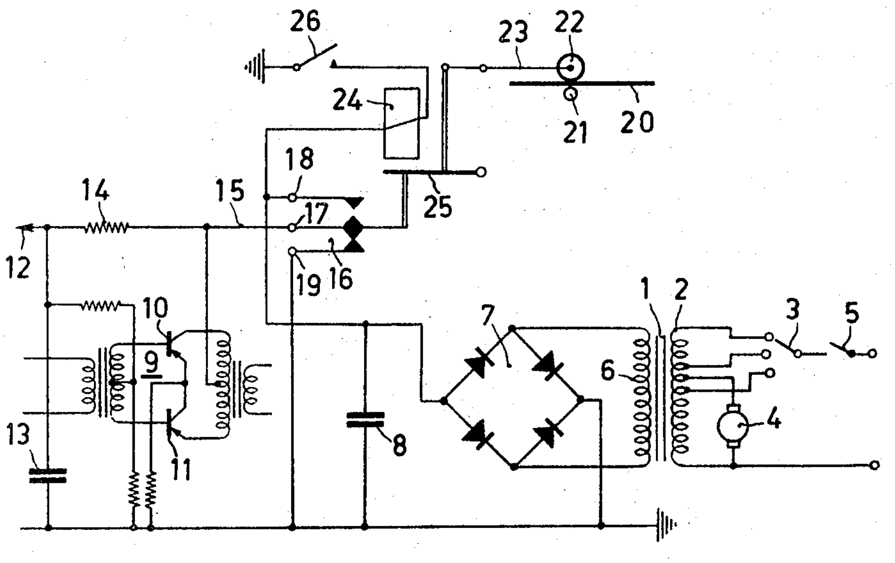
INVENTOR
KARL RUPP
BY [signature]
AGENT

United States Patent Office 3,308,246
Patented Mar. 7, 1967

3,308,246
TRANSISTORIZED AMPLIFYING DEVICE FED ON ALTERNATING CURRENT

Karl Rupp, Vienna, Austria, assignor to North American Philips Company, Inc., New York, N.Y., a corporation of Delaware
Filed Dec. 18, 1961, Ser. No. 159,884
Claims priority, application Austria, Dec. 22, 1960, A 9,603/60
3 Claims. (Cl. 179—100.1)

In devices for the recording or reproduction of sound or pictures, the reduction of the consumption of energy as much as possible is desirable not only if batteries are used as a source of energy, but also if the devices are fed with energy from the A.C. supply, since the dimensions and the cost of a line transformer and other components are determined to a great extent by the power required. A considerable saving in power may result if transistors are used in place of tubes in the amplifier of the device. However, it has been found that additional steps may be taken to reduce the power consumption.

According to the invention, in an alternating current supplied transistor amplifier used in devices for the recording or reproduction of sound or pictures, the supply conductor of the amplifier leading to the lines rectifier includes a commutator which may be switched by means of a switching member which also controls the forward movement of the sound carrier at normal speed, in such a manner that the supply conductor of the amplifier is connected to the capacitor for charging the mains rectifier if the forward movement is switched on and connected to zero potential if the forward movement is at rest.

The present invention is based upon recognition of the fact that the amplifier is used only during the recording and reproduction operations. Since the switching on and off of transistor amplifier (which, because of the transistors, is ready for operation almost immediately after switching on) is co-ordinated in a special way with the switching member which controls the movement of the sound carrier associated with these forms of operation, that is to say the forward movement at normal speed, a number of advantages are provided, in addition to the advantage that the line transformer is unloaded when the amplifier is switched off.

To permit the A.C. devices to be used at different line voltages, the primary winding of the supply transformer is usually made with a tapped winding and a tapping switch provided. The electric motor is connected to a tap on the primary winding, thus avoiding a separate switch of the motor windings. The transformer primary winding is thus also loaded by the electric motor, especially when the motor must provide a higher power, for example, when the sound carrier is moving quickly during rewinding. It is very important, in order to reduce the size of the transformer, that the amplifier is not supplied with energy during rapid movement of the sound carrier. This is especially important if, as previously mentioned, a so-called motor transformer is used for the energy transmission; in which the motor winding which also serves as the primary winding carries a secondary winding for feeding the amplifier.

Furthermore, if the amplifier is off, the rectifier usually draws no current and the charging capacitor is charged to its maximum potential and hence to the maximum charging energy. Consequently, if an electromagnet is provided for switching on the forward movement of a sound carrier at normal speed, this high energy is available at the moment when the armature of the electromagnet is attracted. This otherwise also applies to other electromagnetic control means which control, for example, a slow moving back of the sound carrier or the switching from recording to reproduction.

Since the amplifier is wholly inoperative when the sound carrier is not moving or during all other sorts of movement, except for the forward movement at normal speed, the occurrence of interference, unwanted reproduction, unwanted recording, etc., is avoided under such conditions. In addition, a discharge of the amplifier capacitors, which is favourable for their life, is guaranteed due to the special form of switching off of the amplifying portion.

In order that the invention may be readily carried into effect, it will now be described more fully, by way of example, with reference to one special embodiment shown in the accompanying drawing, which relates to a magnetic recorder. The invention is not, however, limited to this embodiment.

The primary winding 2 of a supply transformer 1 may be switched to different line voltages by means of a switch 3. An electric motor 4 is connected to a tap on the primary winding 2. The supply line is energized by means of a switch 5. A rectifier 7 for charging a charging capacitor 8 is connected to the secondary winding 6. For the sake of clarity only the push-pull output stage 9 of the amplifier, which comprises transistors 10 and 11, is shown. A supply conductor 12 leads to the preamplification stages and the oscillator. A capacitor 13 and a resistor 14 constitute a filter. A supply conductor 15 for the complete amplifier is connected to the movable contact 17 of a commutator 16. Two fixed contacts 18 and 19 of commutator 16 are connected to the charging capacitor 8 and ground respectively.

The system for controlling the movement of the sound carrier at normal speed during recording and reproduction is also shown diagrammatically. The sound carrier 20 is driven by the electric motor 4 when urged against a sound spindle 21 by means of a special roller 22 carried by a pivoted lever 23. The lever 23 is coupled to the armature 25 of an electromagnet 24 so that the pressure roller 22 is pushed against the sound spindle 21 when the electromagnet 24 is traversed by current and hence the armature 25 is attracted. A switch 26 serves to energize the electromagnet 24 and thus control the forward movement at normal speed. The electromagnet 24 is energized directly by the charging capacitor 8. The movable contact 17 of commutator 16 is also connected to the armature 25 of electromagnet 24 so that upon switching on the forward movement at normal speed, the illustrated connection of the central contact 17 and hence of the supply conductor 15 to the contact 19, which is at zero potential, is interrupted and commutation to the contact 18 and hence connection of the supply conductor 15 to the charging capacitor 8 takes place.

When the connection between contacts 17 and 19 is restored upon switching off the forward movement of the sound carrier, the discharge of the capacitors of the amplifier, for example of the filter capacitor 13, takes place through resistors, for example through resistor 14 instead of through a short circuit, in a manner favorable to the life of the capacitor.

In certain cases, for example if it is desirable that a tape can be erased also during quick movement, the oscillator device may be separated from the amplifier and connected to the charging capacitor 8 either directly or through separate switching contacts which are also actuated by the switches for the desired form of operation (recording) or form of movements (rapid movement).

The invention is naturally not limited to the provision of a commutatable amplifier or separate amplifiers for recording and reproduction or, in the case of devices having a plurality of tracks, for example stereophonic devices, to the provision of a corresponding number of amplifiers.

What is claimed is:

1. In recording and reproducing apparatus of the type having a movable carrier and means for moving said carrier at different rates of speed, a transistor amplifier having an operating voltage terminal and a ground terminal, a source of alternating voltage, rectifier means, a transformer having a primary winding connected to said source and a secondary winding connected to said rectifier means, charging capacitor means connected to said rectifier means and having one electrode connected to said ground terminal, commutating means having first, second and third contacts, means connecting said first terminal to said operating voltage terminal, means connecting said second terminal to said ground terminal, means connecting said third terminal to the other electrode of said capacitor, electromagnetic means having a coil and being mechanically coupled to said commutating means, means mechanically coupled to said electromagnet means for controlling said means for moving said carrier at different rates of speed, and means for connecting said coil in parallel with said capacitor, whereby said amplifier is energized at a first predetermined rate of speed of said carrier and said ground and operating voltage terminals are connected together at a second predetermined rate of speed of said carrier.

2. An apparatus of the type for recording signals on a movable carrier and reproducing signals from said carrier, said apparatus comprising a transistor amplifier connected to amplify said signals, a source of operating voltage for said amplifier comprising a source of alternating voltage, rectifier means, a transformer having a primary winding connected to said source of alternating voltage, a secondary winding connected to said rectifier, and a charging capacitor connected to said rectifier whereby a direct operating voltage is developed across said capacitor, an electromagnet connected to control the form of movement of said carrier, switch means for selectively connecting said electromagnet to said capacitor for energization of said electromagnet means, said amplifier having first and second operating voltage terminals, commutating means connecting said terminals to said capacitor, and means mechanically coupling said electromagnet to said commutating means whereby said first and second terminals are connected to opposite electrodes of said capacitor when said electromagnet is energized, and said first and second terminals are connected together when said electromagnet is deenergized.

3. The apparatus of claim 2, in which said primary winding has a tap, comprising motor means for moving said carrier connected between said tap and one end of said primary winding.

References Cited by the Examiner

UNITED STATES PATENTS

| | | | |
|---|---|---|---|
| 2,680,786 | 6/1954 | Chalfin | 179—100.4 |
| 3,047,663 | 7/1962 | Zimmermann | 179—100.2 X |
| 3,070,668 | 12/1962 | Owner et al. | 179—100.2 |

BERNARD KONICK, *Primary Examiner.*

IRVING L. SRAGOW, *Examiner.*

H. D. VOLK, J. W. MOFFITT, *Assistant Examiners.*